US007529268B1

(12) United States Patent
Solanki

(10) Patent No.: US 7,529,268 B1
(45) Date of Patent: May 5, 2009

(54) MULTI-POINT ELECTRONIC CONTROL SYSTEM PROTOCOL

(75) Inventor: Vijaykumar J. Solanki, Poway, CA (US)

(73) Assignee: Hamilton Sundstrand Corporation, Rockford, IL (US)

(*) Notice: Subject to any disclaimer, the term of this patent is extended or adjusted under 35 U.S.C. 154(b) by 1314 days.

(21) Appl. No.: 10/256,668

(22) Filed: Sep. 27, 2002

Related U.S. Application Data

(60) Provisional application No. 60/325,364, filed on Sep. 27, 2001.

(51) Int. Cl.
*H04J 3/02* (2006.01)

(52) U.S. Cl. .................. 370/462; 370/362; 370/451; 709/209; 710/107

(58) Field of Classification Search .......... 370/465, 370/470–476, 252, 362, 449–451, 462; 710/15, 710/107–125, 305–310, 45; 709/208–211
See application file for complete search history.

(56) References Cited

U.S. PATENT DOCUMENTS

| | | | |
|---|---|---|---|
| 5,471,590 A * | 11/1995 | Melo et al. ............. 710/108 |
| 5,526,409 A * | 6/1996 | Conrow et al. ........ 379/91.02 |
| 5,761,486 A * | 6/1998 | Watanabe et al. ........... 703/21 |
| 5,845,097 A * | 12/1998 | Kang et al. ............... 710/117 |
| 5,983,302 A * | 11/1999 | Christiansen et al. ..... 710/113 |
| 6,061,365 A * | 5/2000 | Yeung et al. ............. 370/470 |
| 6,279,061 B1 * | 8/2001 | Aoki et al. ................ 710/65 |
| 6,571,306 B1 * | 5/2003 | Smith ..................... 710/240 |
| 6,718,422 B1 * | 4/2004 | Kelley et al. ............. 710/309 |
| 6,745,259 B2 * | 6/2004 | Wagner .................... 710/33 |
| 6,763,040 B1 * | 7/2004 | Hite et al. ................ 370/522 |
| 6,907,476 B2 * | 6/2005 | Wagner .................... 710/11 |
| 6,993,612 B2 * | 1/2006 | Porterfield .............. 710/110 |
| 7,003,613 B1 * | 2/2006 | Wang et al. ............. 710/305 |
| 7,051,123 B1 * | 5/2006 | Baker et al. .............. 710/22 |
| 2002/0194596 A1 * | 12/2002 | Srivastava ............... 725/37 |

\* cited by examiner

*Primary Examiner*—Aung S Moe
*Assistant Examiner*—Habte Mered
(74) *Attorney, Agent, or Firm*—Carlson, Gaskey & Olds PC

(57) ABSTRACT

A generic software protocol allows communication between multiple devices within an electronic control system as well as between an electronic control system and an external monitoring device. The generic software protocol is reflected in embedded software in each device in the electronic control system. By using the same protocol in all of the electronic control system devices, the protocol reduces computer processing overhead while providing a predictable, yet flexible framework for device communication.

14 Claims, 4 Drawing Sheets

MULTI-POINT ELECTRONIC CONTROL SYSTEM PROTOCOL

REFERENCE TO RELATED APPLICATIONS

This application claims priority based on U.S. Provisional Appln. No. 60/325,364, filed Sep. 27, 2001, the disclosure of which is incorporated herein by reference in its entirety.

TECHNICAL FIELD

The present invention is directed to a system interface protocol for electronic control systems, and more particularly to a system interface protocol that allows multiple electronic control systems to communicate with each other and to be monitored externally.

BACKGROUND OF THE INVENTION

Electronic control systems often include multiple devices, each device having its own embedded software for controlling the device. Ideally, the devices can communicate freely with each other. Further, it is desirable for the system characteristics of the devices to be monitored and modified externally via a user interface. However, differences in the embedded software among the devices makes communication between the devices themselves and between the devices and the user interface difficult. Differences in communication protocols, rules, and definitions among devices require high computer processing overhead to sustain free communication among the devices.

There is a desire to allow multiple devices in an electronic control system to communicate with each other without requiring high processing overhead.

There is also a desire to allow external monitoring and manipulation of different devices in an electronic control system via a common user interface.

SUMMARY OF THE INVENTION

The present invention is directed to a generic interface and software protocol that allows communication between multiple devices within an electronic control system as well as between an electronic control system and an external monitoring device, such as a user interface. In one embodiment, the interface and software protocol are reflected in embedded software in each device in the electronic control system.

DETAILED DESCRIPTION OF THE EMBODIMENTS

Figure 1:
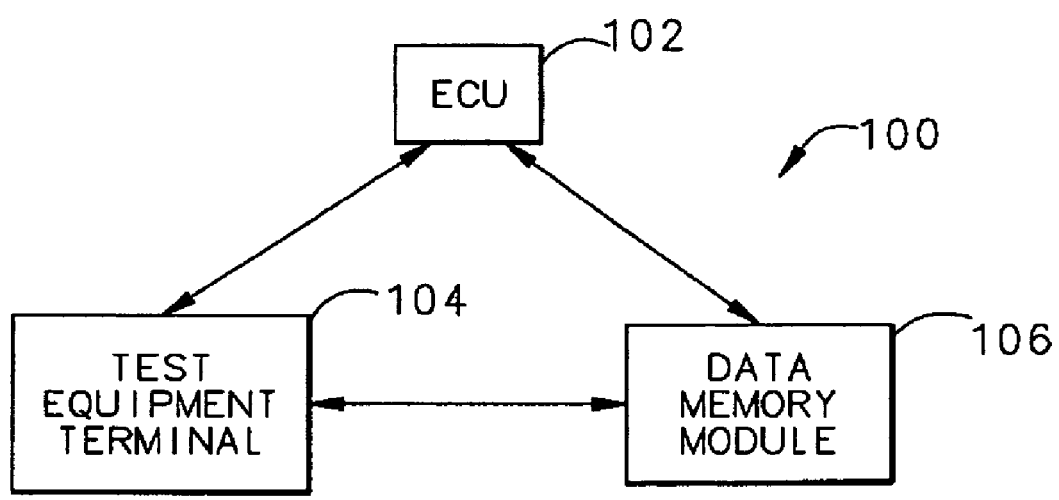
FIG. 1 is a representative diagram of an electronic control system incorporating one embodiment of the present invention.

FIG. 1 is a representative diagram of an electronic control system 100 in which the inventive protocol may be applied. The system 100 may include, for example, an electronic control unit (ECU) 102, a user interface (e.g., test equipment terminal 104) and a data memory module (DMM) 106 as well as other optional system devices (not shown) in communication with the ECU 102, test equipment terminal 104, and the DMM 106. All of the devices in the illustrated electronic control system 100 are assumed to be connected to the same communication interface. In one embodiment, communication between the devices is carried out via any standard communication interface (e.g., RS-485 serial communication interface). The test equipment terminal 104 acts as a user interface that allows monitoring and modification of the other devices in the system 100. One embodiment of the test equipment terminal 104 is described in commonly-assigned, co-pending U.S. application No. 10/259,184. (Attorney Docket No. 67036-017), the disclosure of which is incorporated herein by reference.

Figure 2:
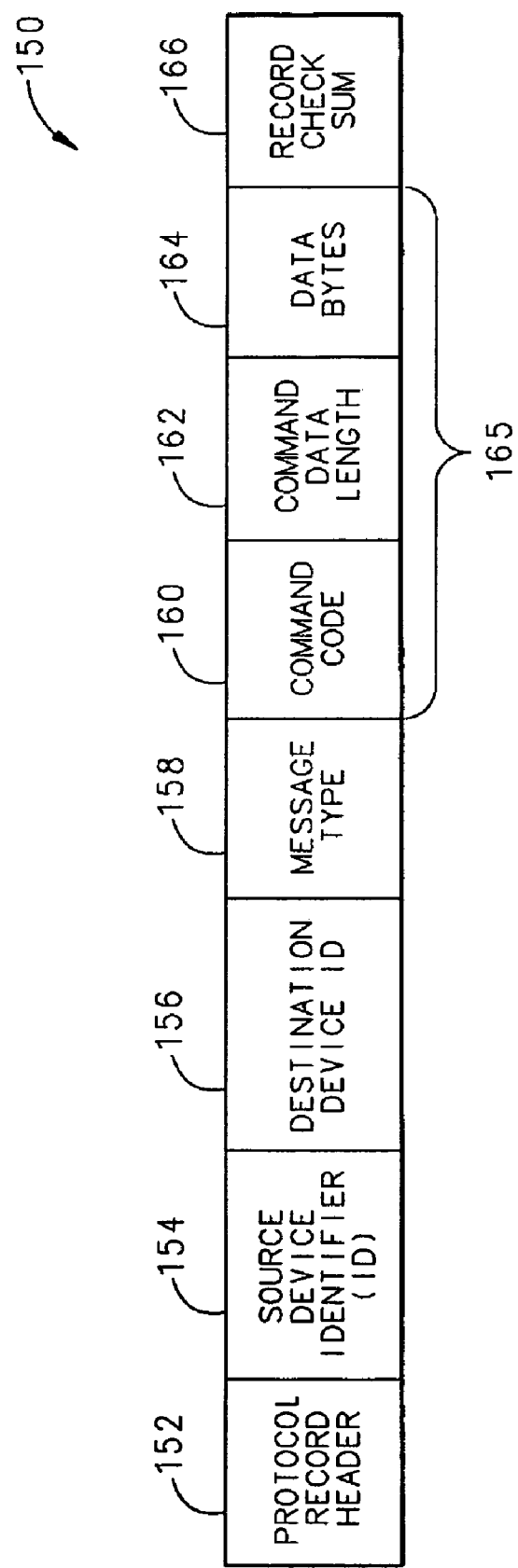
FIG. 2 is a representative diagram of a data format for a protocol record according to one embodiment of the invention.

FIG. 2 is a representative diagram of a protocol record 150 in the protocol according to one embodiment of the invention. Since the example protocol record 150 in FIG. 2 comprises a command, one may also call the protocol record 150 a command record. The inventive protocol acts as a communication interface protocol and can be implemented via embedded software in the system 100 devices. The command record 150 includes multiple fields, such as a protocol record header 152, a source device ID 154, a destination device ID 156, a message type 158, a command code 160, a command data length 162, data bytes 164 and a record checksum 166. Each of these items will be described in greater detail below.

In one embodiment, the protocol record 150 has a minimum length of 7 bytes and a maximum length of 7+255 bytes. Although the example shown in the Figures and described below suggest a bit length (e.g., 8 bits) for each field, those of ordinary skill in the art will understand that the command record 150 and the fields in the protocol record 150 can have any length. Although the example described herein assumes that the fields are generally 1 byte long, other field sizes, such as 16-bits or 32-bits, may be incorporated without departing from the scope of the invention to accommodate, for example, a greater number of custom protocols and/or commands. By using the same protocol in all of the devices in the electronic control system 100, including the user interface (e.g., the test equipment terminal 104), the inventive protocol allows seamless communication between the devices as well as seamless external monitoring and manipulation of characteristics in the devices.

The protocol record header 152 is the first field in the command record 150 and indicates the beginning of a new command record. The protocol record header 152 is preferably a predetermined code that is the same for all command records 150 so that devices will be able to identify the start of each command record 150.

The next field is a source device ID 154, which holds an address of the device sending the command record 150. The destination device ID field 156 holds an address of the device receiving the command record 150. In one embodiment, each device in the electronic control system 100 is assigned a unique ID so that the source device ID 154 and destination device ID 156 fields can easily indicate the devices acting as the source (originating) device and destination (recipient) device, respectively, for a given command record 150.

The message type field 158 identifies the type of command held by the command record 150. In one embodiment, the data in the message type field 158 holds a predetermined value associated with a selected control function. FIG. 2 shows one example of a possible control functions that can be identified in the message type field 158. For example, if the message type field 158 contains a value corresponding to a control request, it indicates that the command record 150 is a message that is sent from a master device (as identified by the source device ID 154) to request information or action from a slave device (as identified by the destination device ID 156). Similarly, if the message type field 158 indicates that the command record 150 is a response to a request, then the command record 150 is a message sent from a slave device in response to a previous control request from a master device.

Other possible message types 158 include an information record (which broadcasts information that requires processing by, but not response from, the destination device), an acknowledgement (which is sent by a destination device to a source device to acknowledge receipt and processing of a command from the source device), negative acknowledgement (which indicates to the source device that received data has failed the checksum, was incomplete, or is otherwise rejected by the destination device), command not recognized (which indicates that the command sent by the source device was not recognized by the destination device), and command failed (which indicates that the destination device understood the command sent by the source device but was unable to process it). Note that the message types 158 described above are not meant to be a comprehensive list, and those of skill in the art may identify other message types without departing from the scope of the invention.

The command code 160 acts as the heart of the command record 150 because it carries instructions for the destination device. The command data length 162 indicates the number of data bytes in the data byte field 164. The command code 160, command data length 162 and data bytes 164 work together as a command description 165 that carries out various functions, examples of which will be described in greater detail below. Note that the data byte field 164 can be any desired length and can contain any data corresponding to the particular command, as will be described in greater detail below.

The checksum 166 is generated by adding each data byte in the command record 150 and discarding any overflow. By including the checksum 166 in each command record 150, the inventive protocol provides built-in error checking for each command 150. In one embodiment, the checksum 166 excludes the protocol record header byte 152 and the checksum byte 166 in its calculation because the protocol record header 152 and checksum 166 are common to all command records 150.

Figure 4:
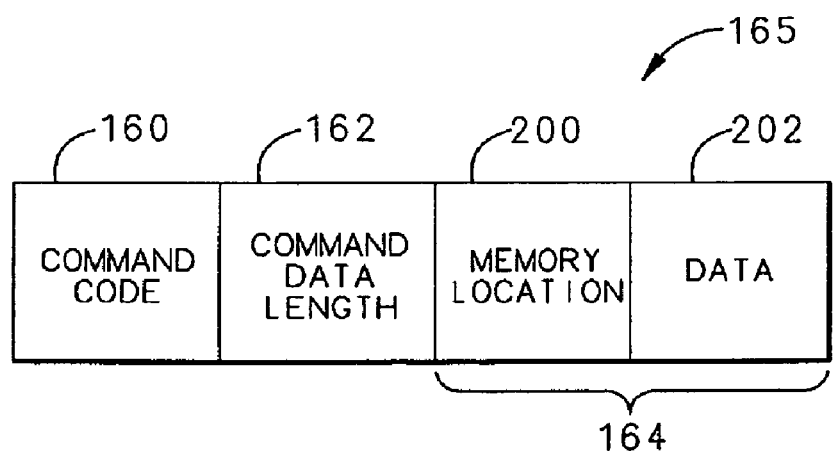
FIG. 4 is a block diagram of another command description format according to one embodiment of the invention.
Figure 5:
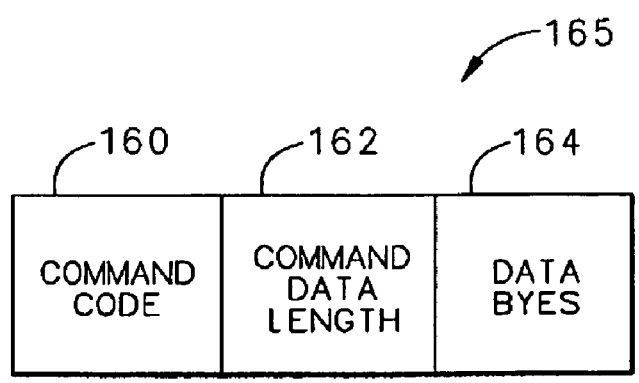
FIG. 5 is a block diagram of yet another command description format according to one embodiment of the invention.
Figure 6:
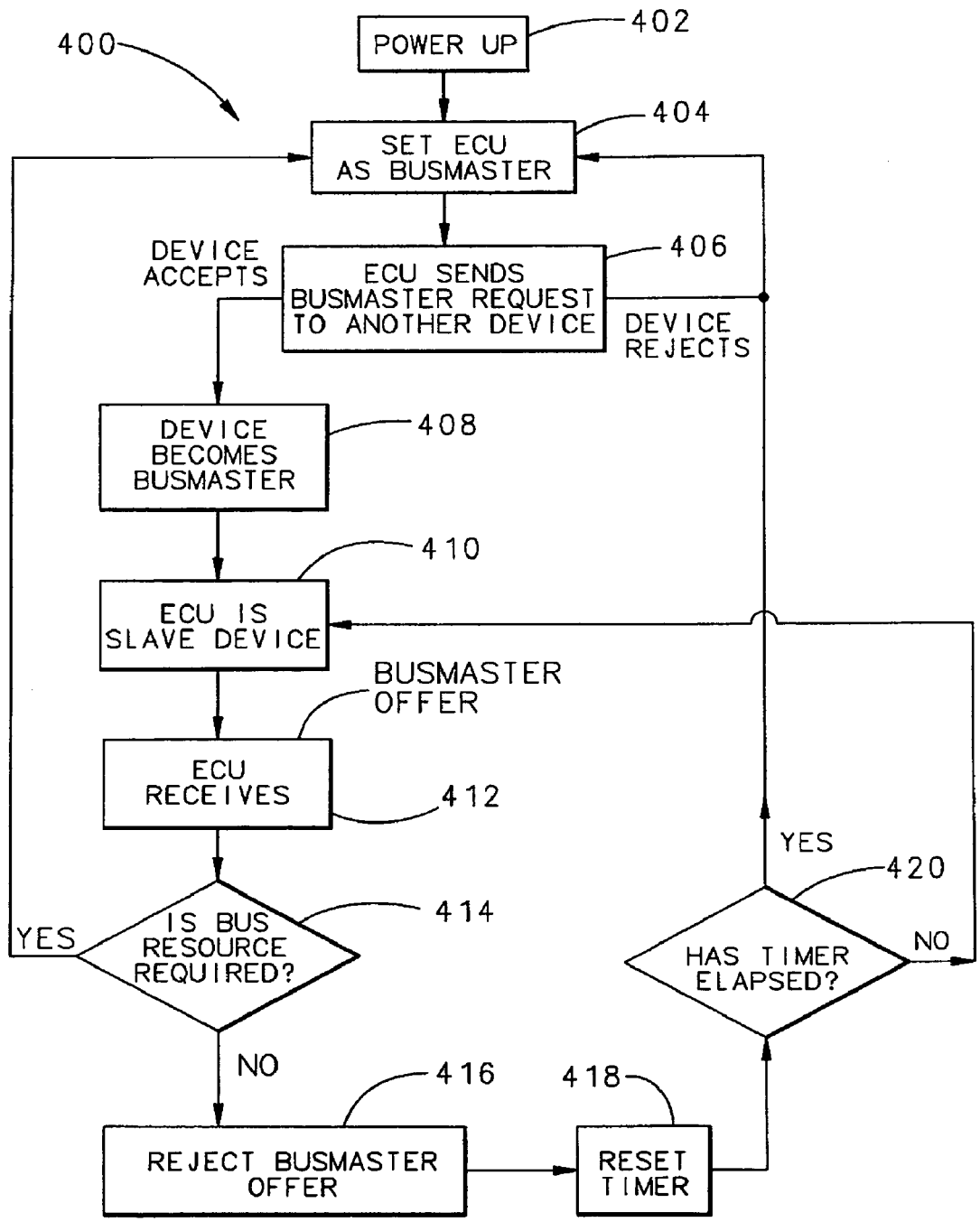
FIG. 6 is a flow diagram illustrating a bus master request process according to one embodiment of the invention.

The structure and contents of the command description 165 itself can vary based on the particular command, but in general they all contain a command code 160 and the command data length 162. The command code 160 and command data length 162 allow the destination device to determine how to respond to the command record 150 and the actual length of the complete command description 165. In one embodiment, commands fall into one of three categories, as shown in FIGS. 4 through 6. Those of skill in the art will be able to assign specific command codes to carry out the functions described below.

Figure 3:
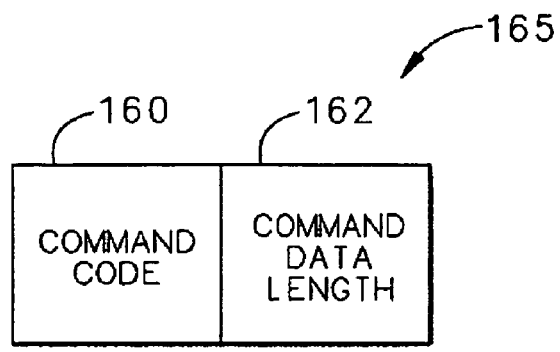
FIG. 3 is a block diagram of a command description according to one embodiment of the invention.

FIG. 3 illustrates one structure for the command description 165. In this structure, the command description 165 only contains the command code 160 and the command data length 162 without any additional data bytes 164. In this case, the command data length equals zero, indicating to the destination device the checksum 166 field immediately follows the command data length field 162 without any intervening data. This command description structure 165 can be used for any command record 150 that acts as a direct, straightforward command to the destination device.

Examples of commands that may have the command structure shown in FIG. 3 include a device status request (to check pre-assigned status flags in the destination device), self-test request (asking the destination device to self-test), a bus master request (described in greater detail below with respect to FIG. 3), a software loading request (asking the destination device to start a software download), a load flight software complete command (informing the destination device that all software data has been downloaded), and configuration requests (asking the destination device to send application software, boot software or hardware configuration information). Other commands may also incorporate the command description structure shown in FIG. 4 as long as they do not require additional data to complete the command.

Note that the command description 165 may even omit the command data length if it is transmitted at power up between the ECU 102 and the test equipment terminal 104 to initiate a software downloading process. In one embodiment, the ECU 102 transmits a command record having a predetermined command code 160 to the test equipment terminal 104 and waits for a predetermined response from the terminal 104. If the terminal 104 responds properly to the predetermined command code from the ECU 102, the ECU 102 downloads software from the interface 104 before proceeding with the normal power-up sequence. If not, the ECU 102 simply powers up in the usual fashion and ignores any software downloading commands from the interface 104.

FIG. 4 illustrates another possible command description 165 structure. In this embodiment, the command description 165 has a command code 160 and command data length 162 as described above. Unlike the structure shown in FIG. 3, however, this command description 165 has data in the data byte field 164 that specifies a memory location 200 and optional data 202. For example, a read data byte command, which instructs the destination device to read data at a specified memory location, would describe the memory location in field 200 but would not contain any additional data 202. A read data block command, however, would specify the size of the block in data field 202 (e.g., the number of bits in the data block to be read) and describe the start of the block at memory location 200.

Write data byte and write data block commands may also have the structure shown in FIG. 4, but the data field 202 may contain data to be written to the location specified in the memory location field 200. The command data length field 162 will indicate the total length of the command, allowing the destination device to determine how much data is stored in the data field 202. Another command having the structure shown in FIG. 4 includes a get buffer record command (where the memory location 200 specifies a buffer ID and reset index that can reset the buffer index in a circular buffer). In short, the command structure shown in FIG. 4 can be used for any command that specifies a particular memory location.

The command description 165 may also be in the form of a more generic command, as shown in FIG. 5, where the data byte field 164 contains bytes that form embedded command instructions (custom command), software data (e.g., flight software data) to be loaded into the destination device (load flight software data block transmission command), a fill character and number of pages to be filled by the fill character (fill command), CRC data (CRC command), memory address locations and data size of variables to be recorded in the ECU (setup record data variables command), or the number of times to transmit values of variables defined in the setup command (start recording data command).

Regardless of the specific command record 150 sent to the destination device, the destination device can respond with an acknowledgement, negative acknowledgement, bytes containing pre-assigned flags, or data blocks containing requested data. The format for the flags and data blocks can be any format compatible with the devices in the system, which can be determined by those of ordinary skill in the art based on the command requests described above.

FIG. 6 is a flow diagram illustrating a bus mastering process 400 according to one embodiment of the invention. If the command description 165 is a bus master request, the command allows the destination device to act as a bus master and control other devices in the system 100. When the electronic control system 100 powers up (block 402), the ECU 102 is set as the bus master (block 404). The ECU 102 then sends a bus master request to another device (block 406). If a device receives a bus master request, the device has the option to accept or reject the request via an acknowledgement/negative acknowledgement message.

If the destination device accepts the offer, the device becomes the bus master (block 408) and the ECU 102 becomes a slave device (block 410). As a result, the ECU 102 and the new bus master device are synchronized. When the ECU 102 is a slave device, it will not transmit any commands on its own; instead, it will transmit commands only in response to commands received from other devices. If the ECU 102 receives a bus master offer from another device (block 412), it will check whether the bus resource is required (block 414). If so, the ECU 102 will accept the offer and switch back to being the bus master (block 404). If the bus resource is not required, it will reject the bus master offer (block 416) and reset an internal timer (block 418).

If the ECU 102 does not receive another bus master offer within the time set by the internal timer (block 420), the ECU 102 will automatically assume bus master control. Also, if the destination device rejects or fails to respond to the bus master request, the ECU 102 will assume bus master control. In both of these cases, the ECU 102 may act as both a bus master and a slave device, responding to inquiries from other devices (e.g., a test equipment terminal) as well as sending commands. If this occurs, the communication between the ECU 102 and other devices is unsynchronized. In one embodiment, if the other devices in the system 100 assume bus control, they assume control only long enough to send a current command.

Note that when the ECU 102 is switched from being a slave to being a bus master, the ECU 102 may schedule its own bus master query request after a selected time period. By conducting its own bus master query requests at selected time intervals, the ECU 102 allows faster switching of bus master duties between devices. Further, to avoid extended time periods where the ECU 102 and other devices are unsynchronized, the ECU 102 may send more frequent bus master requests than originally scheduled if other devices reject or fail to respond to a previous bus master request. If the devices 100 are designed to always accept bus master offers, system 100 response time will be faster. Switching bus master duties over multiple devices allows the devices to communicate over a single serial communication line without causing bus collisions or conflicts where more than one device is transmitting data on the communication bus at the same time.

As a result, the invention offers a generic protocol that can accommodate all devices connected to a given communication interface, allowing the devices to communicate with each other and require little or no change to operate different applications. The inventive protocol provides a flexible framework in which multiple devices can communicate in a predictable manner without requiring high levels of computer processing overhead. Further, the invention allows external monitoring and testing of the devices in the electronic control system 100, again with little or no changes to the devices themselves or their internal data or parameters. The inventive protocol can support system development testing, system parameter adjustments during development, qualification testing, verification of system performance, acceptance testing during production, and other functions that ordinarily would be difficult without a generic interface and protocol.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An electronic control system having a plurality of devices and connected to a communication interface, comprising:
   a source device identifier indicating a source device sending a command record;
   a destination device identifier indicating a destination device receiving the command record;
   a command description containing a command code corresponding to a message from the source device to the destination device; and
   a message type identifier indicating that the command record is a control request, the control request including a bus master request that asks the destination device to assume control over the communication interface,
   wherein all of said plurality of devices connected to the communication interface use the communication protocol to communicate with each other via the communication interface,
   wherein the destination device acting as the bus master sends the bus master request to another one of said plurality of devices after a predetermined time period.

2. The communication protocol of claim 1, wherein the command description further comprises at least one from the group consisting of:
   a command data length field; and
   a data byte field, wherein the command data length field indicates a length of the data byte field.

3. The communication protocol of claim 2, wherein the data byte field contains at least one selected from the group consisting of a memory location, a data block size, data to be written to the memory location, status information, a custom command, a buffer identification, a fill character, a number of byte pages, cyclical redundancy check data, variable data, and a number of transmissions.

4. An electronic control system, comprising:
   an electronic control unit;
   a memory module; and
   a user interface, wherein the electronic control unit, the memory module, and the user interface are connected to a communication interface and communicate with each other via the communication interface using embedded software that implements a communication protocol, the communication protocol comprising
      a source device identifier indicating a source device sending a command record;
      a destination device identifier indicating a destination device receiving the command record; and a command description containing a command code corresponding to a message from the source device to the destination device, wherein devices other than the electronic control unit may obtain bus master status by accepting a bus master request from another device.

5. The electronic control system of claim 4, wherein the electronic control unit, the memory module, and the user interface exchange control over the communication interface when the command record is a bus master request.

6. The electronic control system of claim 5, wherein the electronic control unit exchanges control over the communication interface with the memory module, the user interface, or another device only long enough for the memory module, user interface, or other device to send a current command.

7. The communication protocol of claim 1, wherein each device in the electronic control system receives a unique identifier for use as a source device identifier and as a destination device identifier.

8. The communication protocol of claim 1, wherein a device assumes control over the communication interface from a bus master only long enough for the device to send a current command.

9. The electronic control system of claim 4, wherein when the electronic control system powers up the electronic control unit is automatically granted a bus master status.

10. The electronic control system of claim 4, wherein when a device has a bus master status all other devices in the electronic control system have a slave status.

11. The electronic control system of claim 10, wherein the electronic control unit, the memory module, and the user interface are devices.

12. The electronic control system of claim 4, wherein the electronic control unit will only accept a bus master request if a bus resource is required.

13. The electronic control system of claim 4, wherein the electronic control unit will reject a bus master request and reset an internal timer if a bus resource is not required.

14. The electronic control system of claim 4, wherein the electronic control unit will automatically assume bus master status if it does not receive a bus master request within a predetermined amount of time.

* * * * *